(12) United States Patent
Damkjær

(10) Patent No.: US 7,278,535 B2
(45) Date of Patent: Oct. 9, 2007

(54) NET BELT

(75) Inventor: Poul Erik Damkjær, Vejle (DK)

(73) Assignee: PED Invest A/S, Vejle Ost (DK)

( * ) Notice: Subject to any disclaimer, the term of this patent is extended or adjusted under 35 U.S.C. 154(b) by 8 days.

(21) Appl. No.: 11/269,244

(22) Filed: Nov. 8, 2005

(65) Prior Publication Data
US 2006/0113167 A1    Jun. 1, 2006

(30) Foreign Application Priority Data
Nov. 10, 2004  (DK) ............................. 2004 01732

(51) Int. Cl.
*B65G 17/06* (2006.01)
(52) U.S. Cl. ....................... 198/853; 198/850
(58) Field of Classification Search ................ 198/850, 198/851, 853
See application file for complete search history.

(56) References Cited

U.S. PATENT DOCUMENTS

| | | | | |
|---|---|---|---|---|
| 2,009,157 A | * | 7/1935 | Zilles et al. | 198/850 |
| 2,255,733 A | * | 9/1941 | Lathrop | 198/822 |
| 2,465,929 A | * | 3/1949 | Rixon | 198/850 |
| 3,095,753 A | * | 7/1963 | Lengyel | 198/850 |
| 3,127,980 A | * | 4/1964 | Lanham | 198/850 |
| 3,160,024 A | * | 12/1964 | Mojonnier | 474/212 |
| 3,231,069 A | * | 1/1966 | Lanham | 198/853 |
| 4,394,901 A | * | 7/1983 | Roinestad | 198/850 |
| 4,436,200 A | * | 3/1984 | Hodlewsky et al. | 198/851 |
| 4,473,365 A | * | 9/1984 | Lapeyre | 474/212 |

FOREIGN PATENT DOCUMENTS

| | | |
|---|---|---|
| EP | 0440999 | 8/1991 |
| EP | 0652169 | 5/1995 |
| WO | WO97/28072 | 8/1997 |

\* cited by examiner

*Primary Examiner*—Mark A. Deuble
(74) *Attorney, Agent, or Firm*—James Creighton Wray; Clifford D. Hyra

(57) ABSTRACT

A chain link is described which may be assembled with other chain links to form a conveyor belt which is particular in that along the front and rear edges, recesses are provided such that a recess along one edge corresponds to no recess at the opposite edge, and that the recesses along one edge inside each recess is provided with two notches protruding into the recess along a common axis parallel to the front/rear edges, and that apertures are provided inside the recesses along the opposite edge, where the apertures can accommodate notches from an adjacent chain link, and that an opening substantially perpendicular to the bottom and top sides connects the aperture with the bottom side for allowing the notches to pass into the aperture.

4 Claims, 4 Drawing Sheets

NET BELT

This application claims the benefit of Danish Application No. PA 2004 01732 filed Nov. 10, 2004, which is hereby incorporated by reference in its entirety.

FIELD OF THE INVENTION

The object of the present invention is to provide a chain link which may be assembled with other chain links to form a conveyor belt. The chain link according to the present invention is particular in that it finds use in check weighing systems where the requirements to the flexibility of the conveyor belt is very high such that the true weight of the object placed on the conveyor belt may be registered by the weighing unit. Other applications are also addressed.

BACKGROUND OF THE INVENTION

For a number of production lines, it is very important to be able to determine the weight either of the materials entering the process, or the products leaving the production line. This is for example true for a number of goods sold in supermarkets such as for example meat items, food items, pre-processed food stuffs, fish, etc.

For these reasons a number of systems have been developed in order to register the weight of items as they travel in the production facility, for example on conveyors. One such systems is known from EP 0440999 wherein a separate conveyor structure is arranged on a weight. As an item is transferred from one conveyor onto the weighing conveyor, the weighing unit will register the added weight placed on the conveyor belt, and thereby the weight of the item to be weighed.

This construction is relatively large as it is a self-standing unit, and furthermore the system from a hygienic point of view comprises a number of drawbacks as it is very difficult to clean these conveyor structures sufficiently in that the conveyor belt in the prior art is a closed surface conveyor belt.

Furthermore, the structure according to the prior art is suitable for one purpose only in that the weighing unit needs to be placed such that influences from the surroundings are completely isolated, and thereby have no effect on the conveyor, or the items placed on the conveyor.

From WO 9728072 a conveyor belt assembled from a plurality of substantially identical chain links is known. The links are provided with substantially rectangular notches along a first edge, which notches are arranged perpendicular to the intended travelling direction. The longer side of the rectangular notches are arranged parallel to the top surface of the links. On the edge opposite the first edge provided with notches, substantially circular recesses are provided. The cross dimensions of the recess corresponds to the length of the rectangle of the notches. The circular recess is furthermore provided with an opening allowing the shorter side of the rectangle on the notch to pass. By turning the connecting chain links such that their top surfaces are parallel, a pivotal coupling is established between the two adjacent chain links. A problem with this prior art construction is the fact that it requires a certain minimum construction height in that the construction of the notches as well as the receiving recesses requires relative dimensions in order to provide the required strength and in order to accommodate and guide the rectangular notches during assembly. These requirements result in a relatively robust and heavy construction.

Furthermore, endless conveyor belts of this type are typically arranged around wheels in either end of the conveying structure. Due to the rectangular shape of the notches and the size of the notch receiving recesses, a certain minimum diameter of the wheels is required such that the risk of disassembly of the chain links is avoided. The overall construction height of the conveying structure is therefore relatively high.

Other types of belts used for check weighing systems are illustrated in prior art documents EP 0283209 and GB 783056, wherein the structure is made from bending a wire or a thin strip of metal back and fourth, and arranging holes perpendicular to the travelling direction close to the front and rear edges of the bent wire. Thereafter, an identical bent wire or a thin strip of metal may be inserted such that the holes overlap and may be connected by a transverse rod. In this manner, a flexible and easily bendable conveyor belt is provided which is suitable for use in a check weighing system. This type of belt, however, comprises a number of disadvantages which the present invention sets out to alleviate. Among these disadvantages is the fact that especially when producing food stuffs, the large number of apertures and parts create a number of crevasses where matter may become stuck. This matter may give rise to contamination, or other unhygienic conditions. Furthermore, the construction of the conveyor belt itself makes it very difficult to thoroughly clean the belt structure such that a high hygienic standard may be maintained, and furthermore such that the flexibility of the belt, and thereby the correctness of the weighing procedure, may be assured.

OBJECT OF THE INVENTION

Consequently, there is a need for a flexible conveyor belt which alleviates the disadvantages of the prior art devices, and at the same time improve the flexibility, the possibility of maintaining a high hygienic standard, and which also when arranged in a check weighing apparatus maintains and provides reliable check weighing results.

DESCRIPTION OF THE INVENTION

In order to provided a conveyor belt which addresses the above mentioned disadvantages and alleviates some of the drawbacks, as well as conveyor belt which is suitable for other special uses, the present invention provides a chain link which may be assembled with other chain links to form a conveyor belt which is particular in that along the front and rear edges, recesses are provided such that a recess along one edge corresponds to no recess at the opposite edge, and that the recesses along one edge inside each recess is provided with two notches protruding into the recess along a common axis parallel to the front/rear edges, and that apertures are provided inside the recesses along the opposite edge, where the apertures can accommodate notches from an adjacent chain link, and that an opening substantially perpendicular to the bottom and top sides connects the aperture with the bottom side for allowing the notches to pass into the aperture and that the notches have a circular cross-section with a diameter y, parallel to the intended travelling direction of the conveyor belt, and that the corresponding aperture has an extent in the intended travelling direction, substantially corresponding to y, and that the opening has an extent in the intended travelling direction, substantially corresponding to or smaller than y, and that the centre of the notches are in the same plane in relation to the top side as the centre of the apertures.

What is provided is hereby a conveyor belt which may be assembled from chain links without the use of a transverse rod. This in combination with the circular shape of the notches makes it possible to make the links much thinner such that less material is used for the production of the chain links. At the same time, the weight of the chain links is reduced such that the items placed on the conveyor will be relatively heavier in relation to the weight of the conveyor belt as compared to other similar structures. Exactly this aspect is important. The provision of circular notches arranged in substantially circular recesses foresees that the resistance and friction during relative pivoting between two adjacent chain links is minimized, and the low weight of each chain link provides that when these inventive chain links are used in a check weighing construction, the influence on the measurements deriving from the conveying structure is minimized due to the combination of almost frictionless assembly of the individual links and the low weight of the chain links whereby the items being conveyed and weighted is not influenced by the conveyor structure. From a hygienic point of view, the avoidance of apertures going through the chain links and the use of a transverse rod reduces the number of crevasses, apertures, etc. where foreign matter may become stuck which may cause unwanted contamination of the items or the process as such, but which also may reduce the flexibility between two adjacent chain links such that inaccurate measuring of the weigh is the result.

A further aspect achieved with the construction is the fact that it is possible to assemble chain links by overlapping the openings provided in one chain link with the notches provided on an adjacent chain link, and in this manner assemble the two chain links by simply pushing the opening down over the notches. In this manner, it is possible to assemble adjacent chain links in a plane perpendicular to the transport plane. This is a very important aspect in that it makes it possible to construct conveyer structures with very low construction heights, in that the usual device for tightening, and keeping the conveyor belt tight in order to assure a smooth running, may be altogether avoided in that the chain links according to the present invention may be assembled without any slack such that the exact length of the conveyor may be provided without any extra means.

The low construction height, furthermore, opens up for further uses such as for example conveyors used for transporting goods forwarded to a user in a cramped space. One such example is the transporting of milk cartons in a cooling storage, for example in a supermarket. The consumer accesses the milk or other similar items by opening a glass door and reaching into the cool storage in order to withdraw the milk cartons. The milk cartons are, usually, placed in trays, crates or boxes such that personal need to access the cool storage at regular intervals in order to remove the empty crates or boxes, and push new filled boxes or crates forward such that they arrive within the reach of the consumer. By placing conveyors according to the present invention on the floor of this cool storage, and optionally at an incline such that the milk cartons will be forced forwards towards the door, where the consumer may gain access, it may be assured that at all times, full crates or boxes of milk cartons are within the reach of the consumer. The milk cartons may also be placed directly on the conveyor. The personnel accessing the cool storage in order to remove the empty crates will need to spend shorter time in the cool storage in that the crates are easily accessible from the outside. In this manner, the consumer is provided with easy access to the products placed inside the cool storage, and the personal does not have to access the cool storage in order to remove empty crates or boxes, and thereby the overall cooling costs may, additionally, be reduced.

Returning to the inventive construction of the belt link, the openings which in use point downwards as items are placed on the top side, furthermore, facilitate that any matter which may have become stuck in the chain link construction may be flushed out, and may leave the chain link construction unhindered.

The notches have a circular cross-section with a diameter y, parallel to the intended travelling direction of the conveyor belt, and that the corresponding aperture has an extent in the intended travelling direction, substantially corresponding to y, and that the opening has an extent in the intended travelling direction, substantially corresponding to or smaller than y, and that the centre of the notches are in the same plane in relation to the top side as the centre of the apertures.

In this manner, by providing the apertures of a size substantially corresponding to the size of the notches, a firm yet flexible connection between two adjacent chain links is assured. This is an important aspect in that the flexibility, i.e. the belt's ability to flex perpendicular to the plane of the belt and not flex in the plane of the belt, and thereby the ability, of the conveyor belt to transfer the load from an item placed on the conveyor belt to an underlying weighing apparatus is dependent thereon. The size of the opening is important in that the assembly of the chain link with adjacent chain links is facilitated by this aspect, and also that the possibility of providing a thorough cleaning in the apertures, around the notches, and in the opening hereby is facilitated.

In a further advantageous embodiment of the invention, the distance between the front edge and the rear edge is x, and that the extent of the recesses in the intended travelling direction of the conveyor belt is at least 50% of x, more preferred 75% of x, and most preferred more than 80% of x.

Although a substantial solid top side may be desirable for some purposes, the present invention also foresees the use of a conveyor belt built up of chain links where the conveyor belt has a very large degree of openings such that foreign matter, liquids, etc. may pass through the conveyor belt completely without being hampered by the conveyor belt structure. Furthermore, for some applications it is desirable to be able to circulate a gas around the items conveyed on the conveyor belt which in this particular embodiment of the invention is very easy in that the openings between adjacent chain links allow for substantially unhindered passage of gas and/or liquid.

Also, with respect to the overall weight of the conveyor belt, the material savings by providing large openings in the conveyor belt is substantial such that the impact of the conveying structure on the weight is seriously reduced. This, as already mentioned above, provides the advantage that loads placed on the conveyor belt for weighing will have a relatively higher weight compared to the conveying structure such that the weight of the conveyer structure will influence the result less. Also, with the built in flexibility of the chain links according to the present invention, it will be easier for smaller items to deflect the conveyor belt and thereby create truer weighing results.

In a further advantageous embodiment, the chain links are manufactured in an injection moulding process, and the links may be assembled in, or in the immediate vicinity of, the injection moulding machine.

This type of production, and especially with the design of the chain links as discussed above, provides for relatively large moulds such that a large amount of links may be produced in each mould at a relatively high production rate. By furthermore assembling the finished chain links in or in the immediate vicinity of the injection moulding machine, it is facilitated that the amount of labour necessary in order to create a finished conveyor belt is reduced in that the chain links may be pre-assembled in predetermined lengths, for example 2 or 3 meters long pre-assembled conveyor belt sections such that the actual mounting of the conveyor belt may be carried out easily.

In respect to the prior art documents mentioned above, the present chain links do not require secondary parts or other loose parts in order to be assembled into a conveyor belt. It is, therefore, relatively easy for personal on site to either replace sections of a worn out or broken conveyor, or to install the conveyor belt as described above.

The distance from the front edge to the rear edge of each chain link may be kept relatively short such that the length of the conveyor belt may be adjusted around substantially any conveying structure without the necessity of having a mechanism for taking up the slack in the conveyor belt. Also, the manner of assembly is very easy in that the openings are positioned superposed the notches whereafter the openings may be forced down over the notches until the notches become lodged in the apertures, whereby a flat and flexible conveyor construction is provided.

In order to further improve the flexibility, the chain links are made from a plastic based material, and that a lubricator has been added to the plastic material, such as Teflon®, silicone oil, or other substances.

By providing lubricators inside the plastic, the relative frictions between the notches and the apertures is further reduced such that the overall conveyor structure appears very flexible, and thereby easily may be flexed by even small loads placed on the conveyor.

The belt has been described above for a few applications. Although the inventive belt may be used in a multitude of applications, especially two additional applications are pertinent: for use in freezing tunnels, and in cooling devices for cooling objects leaving an oven such as for example bread, pizzas, and the like.

Due to the properties of the plastic materials used in injection moulding such as PP, PE, acetyl, nylons and the like, the chain links will have a relatively smooth surface. The products placed on the conveyor, especially in the embodiment where the recesses are very deep, will not freeze or adhere to the conveyor as they leave the freezer or oven, as it is the case with conveyors made from steel. This provides substantial savings in that, traditionally, the products are placed on a piece of paper in order to avoid that the objects adhere to the conveyor structure. This process is labour intensive, reduces the freezing or cooling capacity of the freezer, and the paper needs to be removed again before packaging. These labour intensive procedures are all avoided when using a conveyor belt made from inventive chain links according to the invention.

The present invention also concerns the use of a chain link as described above for assembly of a conveyor belt, which conveyor belt is used in a check weighing process.

Although the chain link only has been illustrated as having a certain configuration, it should be understood that the inventive chain link may be manufactured in any desired width.

DESCRIPTION OF THE DRAWING

The invention will now be described in detail with respect to the accompanying drawing, wherein.

DETAILED DESCRIPTION OF THE INVENTION

Figure 1:
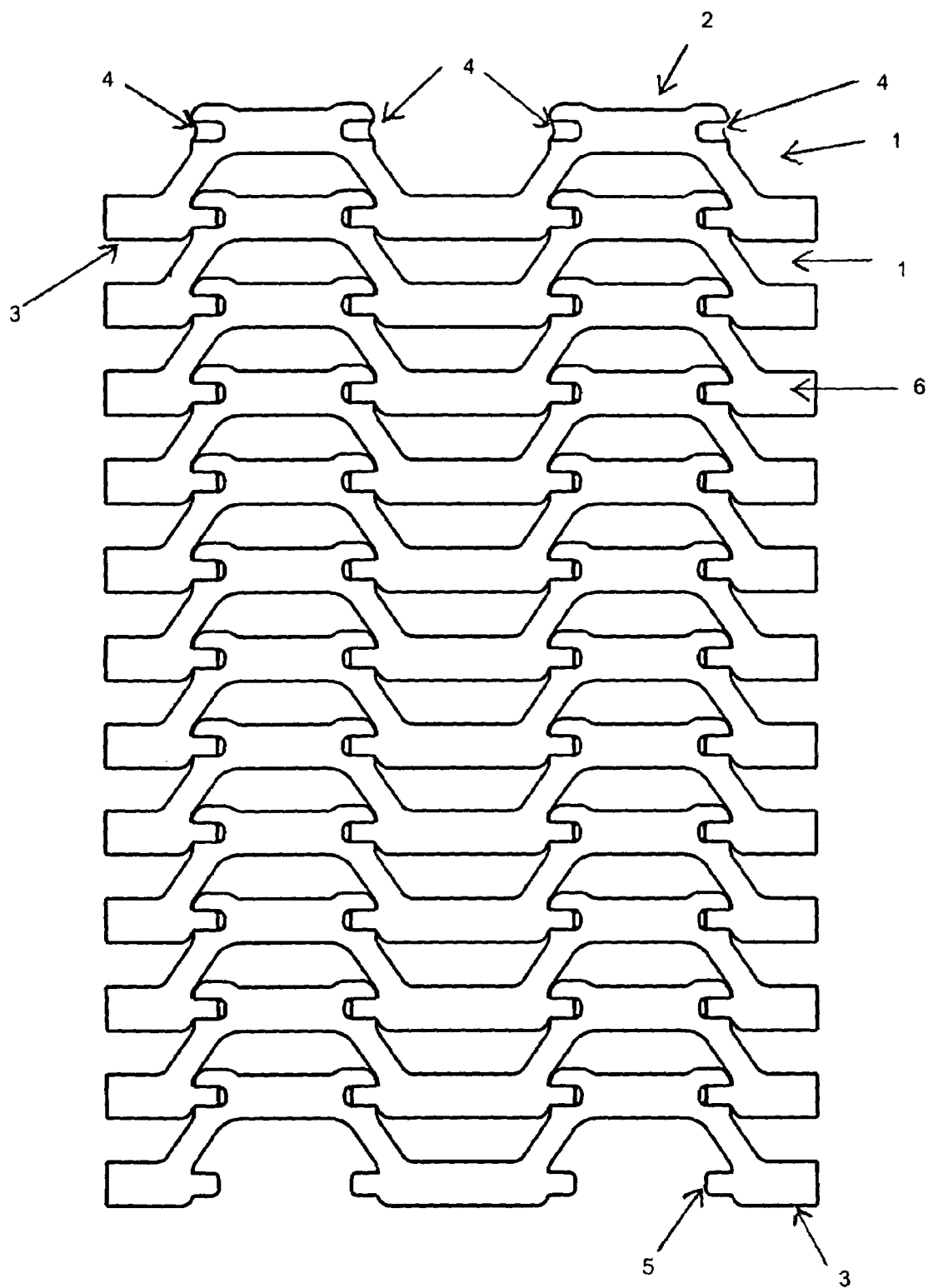
FIG. 1 illustrates a section of a conveyor belt assembled from chain links according to the invention.

In FIG. 1 a section of a conveyor belt assembled from chain links according to the invention is illustrated. In the illustration, the section of the conveyor belt is seen from below.

Each chain link is, as explained above, defined by a top side and a bottom side, a front edge and a rear edge. The front edge 2 and the rear edge 3 define the length of the chain link 1 in the intended travelling direction. Along the front edge 2, apertures are provided having openings 4. Along the rear edge 3 protrusions 5 are provided, which protrusions are dimensioned such that they may pass through the openings 4 and into the apertures arranged along the front edge 2. In this manner, a pinless assembly between two adjacent chain links may be provided such that one chain link may pivot freely in relation to an adjacent chain link.

Figure 2:
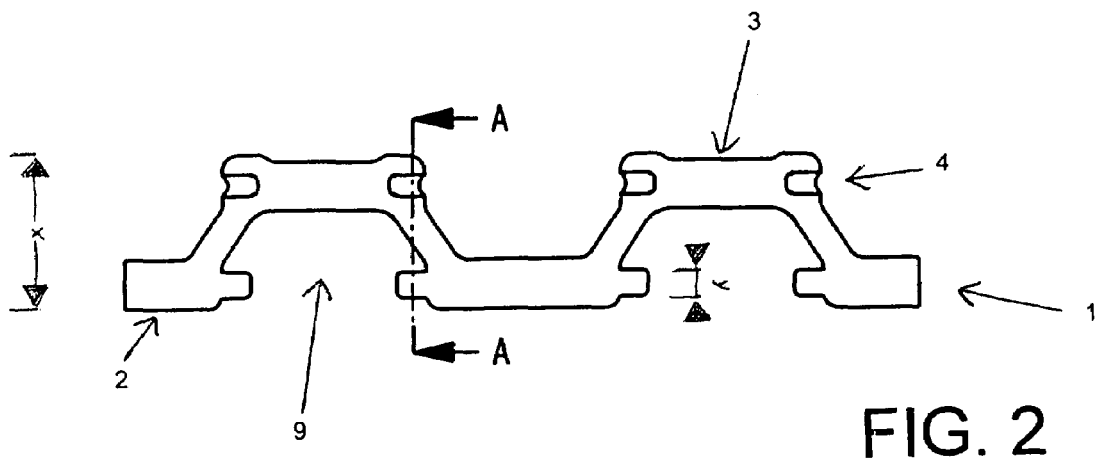
FIG. 2 illustrates a chain link seen from below.

In FIG. 2, a single chain link is illustrated seen from below. The bottom side 6 is very limited in that the recesses 9 arranged along the front edge 2 and the rear edge 3 are quite deep. The size of the protrusions is set to y, and the distance between the front edge 2 and the rear edge 3 is x. By shaping the apertures 8 and the openings 4 at the same time such that the aperture 8 is similar to y, and the opening 4 is equal to or smaller than y, it is achieved that by passing the protrusion through the opening 4 into the aperture 8, two adjacent chain links are maintained in relative position due to the engagement of the protrusion 5 in the aperture 8. The opening 4 being smaller than the cross-section y of the protrusions hinders that the protrusion 5 accidentally slips out of the aperture 8. In this manner, the integrity of the conveyor belt is maintained. It is, however, possible by forcing the protrusion through the opening 4 to disengage two adjacent chain links, for example when replacing a chain link or replacing the entire conveyor belt.

The relationship between the protrusions 5 and the apertures foresees that the conveyor assembled from the chain links only flexes perpendicularly to the transport plane, and not sideways.

As may be seen in the cross-section A-A taken from FIG. 2, the distance between the bottom side 6 and the top side 7 defines the thickness of the chain link. Depending on the loads and stresses which the chain link and thereby the conveyor structure is exposed to, the thickness may be reduced with due regard to the size of the protrusions and the apertures 5,8.

Figure 3:
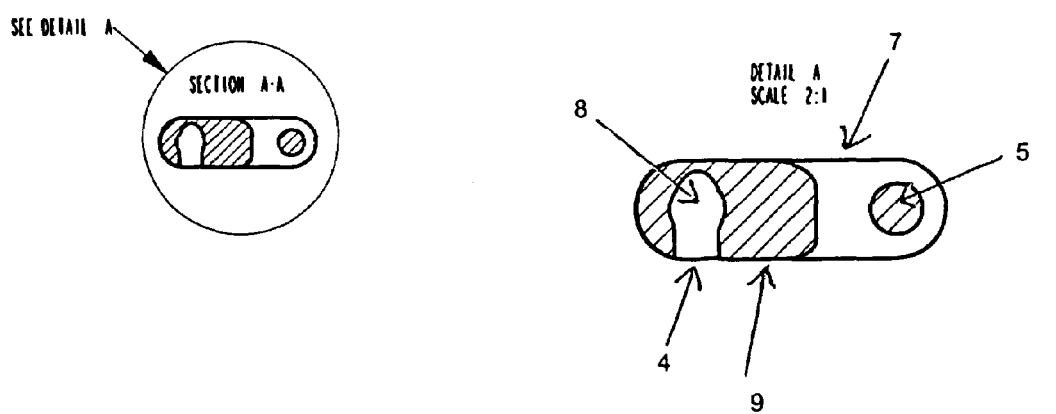
FIG. 3 illustrates a chain link seen from above.
Figure 3:
Figure 3:
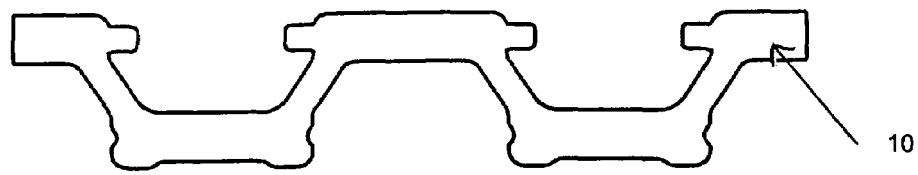
Figure 4:
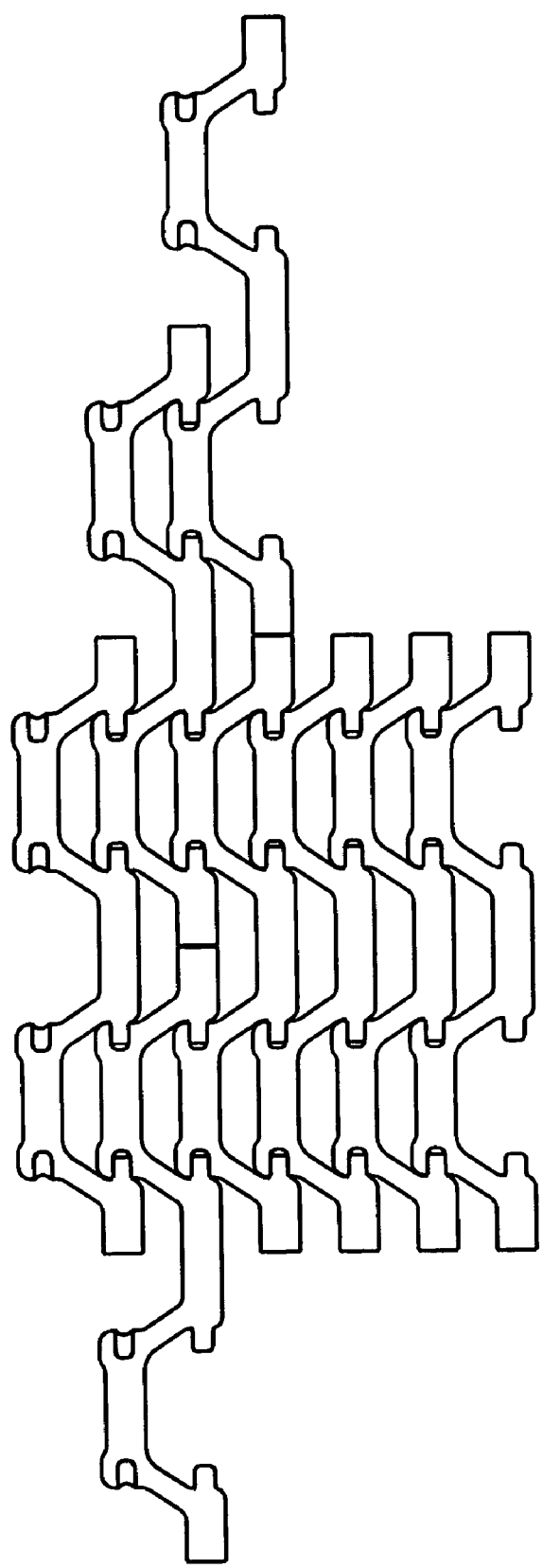
FIG. 4 illustrates the possibility of constructing wider conveyor belts.

In FIG. 3, a chain link 1 is illustrated seen from above, where the openings 4 are not visible. As the recesses 9 equal the distance between two protrusions 5, an intermesh structure as illustrated in FIG. 1 is achieved without any or negligible play in a sideways direction in comparison to the travelling direction. Furthermore, by dimensioning the outermost part of the link 10 to be equal to half the width of a recess 9, a brick laying pattern may be constructed, as illustrated in FIG. 4, such that the chain links according to the invention may be connected in any desirable manner such that a conveyor belt having any width being a multiple of the chain links' width is obtainable.

Figure 5:
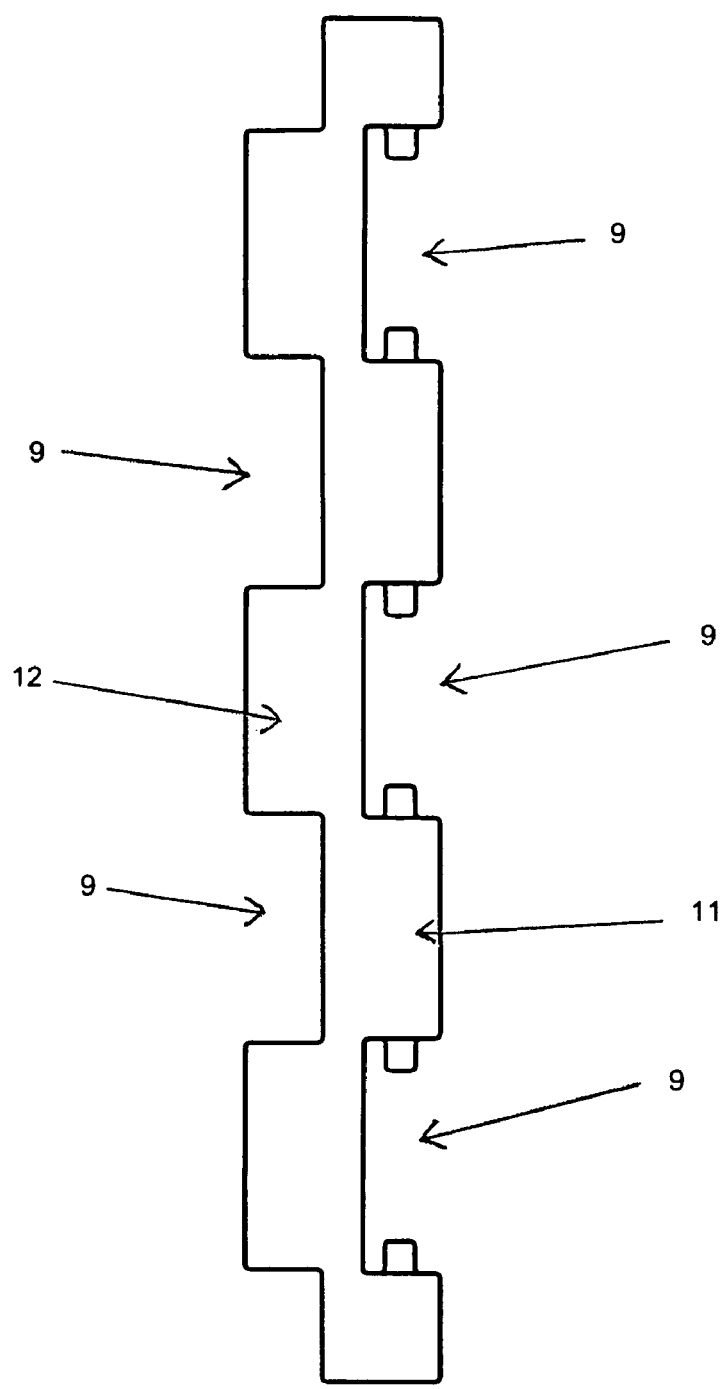
FIG. 5 illustrates the recesses of a chain link.
Figure 5:

In FIG. 5 a chain link 1 is illustrated where the recesses 9 are kept at a minimum. Especially when conveying smaller items, it is desirable to have a substantially complete or solid surface, such that items placed on the conveyor belt will not overturn. By assembling two or more chain links as illustrated in FIG. 5, a substantially closed top surface 7 will be provided. Only small slits between the sections 11 and the bottom of the corresponding recess 9, and the sections 12 and the corresponding recesses 9 will be visible on the top side 7 of the inventive conveyor belt.

Although only a few applications have been mentioned above, it is evident that the chain link due it its very light and simple construction, its simple manner of connecting with adjacent chain links, and its simple construction will be suitable for a number of applications apart from the applications mentioned above.

The invention claimed is:

1. Chain link, which may be assembled with other chain links to form a conveyor belt, wherein the link comprises a top side and a bottom side defining a thickness there between, a front edge end a rear edge wherein along the front and rear edges, recesses are provided such that a recess along one edge corresponds to no recess at the opposite edge, and that the recesses along one edge inside each recess is provided with two notches protruding into the recess along a common axis parallel to the front/rear edges, and that apertures are provided inside the recesses along the opposite edge, where the apertures can accommodate notches from an adjacent chain link, and that an opening substantially perpendicular to the bottom and top sides connects the aperture with the bottom side for allowing the notches to pass into the aperture, and that the notches have a circular cross-section with a diameter y, parallel to the intended travelling direction of the conveyor belt, and that the corresponding aperture has an extent in the intended travelling direction, substantially corresponding to y, and that the opening has an extent in the intended travelling direction, substantially corresponding to or smaller than y, and that the centre of the notches are in the same plane in relation to the top side as the centre of the apertures, wherein the distance between the front edge and the rear edge is x, and that the extent of the recesses in the intended travelling direction of the conveyor belt is at least 50% of x.

2. Chain link according to claim 1 wherein the chain links are manufactured in an injection moulding process, and that the links may be assembled in, or in the immediate vicinity of, the injection moulding machine.

3. Chain link according to claim 1 wherein the chain links are made from a plastic based material, and that a lubricator has been added.

4. Use of a chain link according to claim 1 for assembly of a conveyor belt, which conveyor belt is used in a check weighing process.

* * * * *